(12) United States Patent
Branch

(10) Patent No.: US 9,354,055 B2
(45) Date of Patent: *May 31, 2016

(54) TILT INDICATOR

(71) Applicant: ShockWatch, Inc., Dallas, TX (US)

(72) Inventor: Clinton A. Branch, Jacksboro, TX (US)

(73) Assignee: ShockWatch, Inc., Dallas, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/214,759

(22) Filed: Mar. 15, 2014

(65) Prior Publication Data

US 2014/0196294 A1 Jul. 17, 2014

Related U.S. Application Data

(63) Continuation of application No. 13/917,377, filed on Jun. 13, 2013, now Pat. No. 8,671,582.

(60) Provisional application No. 61/678,308, filed on Aug. 1, 2012.

(51) Int. Cl.
   *G01C 9/20* (2006.01)
   *G01C 9/16* (2006.01)
   *G01C 9/08* (2006.01)
   *G01C 9/10* (2006.01)

(52) U.S. Cl.
   CPC ... *G01C 9/08* (2013.01); *G01C 9/10* (2013.01)

(58) Field of Classification Search
   CPC .............. G01C 9/08; G01C 9/10; G01C 9/16
   USPC ............. 33/365, 333, 347, 371, 391; 116/215
   See application file for complete search history.

(56) References Cited

U.S. PATENT DOCUMENTS

| 3,207,122 A | 9/1965 | Salembier |
| 3,467,053 A | 9/1969 | Davis et al. |

(Continued)

FOREIGN PATENT DOCUMENTS

| CN | 201355249 | 12/2009 |
| CN | 201955082 | 8/2011 |
| WO | 2008038049 | 4/2008 |

OTHER PUBLICATIONS

Shockwatch, Inc.; Internet website—Tilt Indicators (www.shockwatch.com/monitoring-devices/tip-tilt-sensors/tilt-indicators/); May 25, 2012.

(Continued)

*Primary Examiner* — Christopher Fulton
(74) *Attorney, Agent, or Firm* — James L. Baudino

(57) ABSTRACT

According to one aspect of the present disclosure, a device and technique for tilt detection and indication is disclosed. The tilt indicator includes a first member having a reservoir for retaining a granular indicating media therein; and a second member coupled to the first member and having an adhesive portion located corresponding to an indicating area of the first member. Responsive to a tilt event, at least a portion of the indicating media exits the reservoir and travels to the indicating area where the adhesive portion retains at least a portion of the indicating media within the indicating area. A blocking element located within a buffering area located between the reservoir and the indicating area is configured to impede travel of the indicating media from the reservoir toward the indicating area when the tilt indicator is in an activated state.

18 Claims, 8 Drawing Sheets

(56) References Cited

U.S. PATENT DOCUMENTS

| | | |
|---|---|---|
| 3,688,734 A | 9/1972 | Davis et al. |
| 3,880,108 A | 4/1975 | Anton |
| 3,923,000 A | 12/1975 | Cloyd |
| 3,926,144 A | 12/1975 | Lander |
| 4,135,472 A | 1/1979 | Chesla et al. |
| 4,340,008 A | 7/1982 | Mendelson |
| 4,438,720 A | 3/1984 | Conn |
| RE32,570 E | 1/1988 | Conn |
| 4,841,285 A | 6/1989 | Laut |
| 4,924,799 A | 5/1990 | Rilling |
| 4,972,595 A | 11/1990 | Shimamura et al. |
| 4,989,334 A | 2/1991 | DuBose, Jr. |
| 5,463,817 A | 11/1995 | Leeds |
| 5,765,290 A | 6/1998 | Rank et al. |
| 5,955,713 A | 9/1999 | Titus et al. |
| 6,115,929 A | 9/2000 | Tanazawa et al. |
| 6,341,428 B1 | 1/2002 | Tanazawa et al. |
| 6,449,858 B1 | 9/2002 | Reay et al. |
| 6,664,534 B2 | 12/2003 | Hjertman et al. |
| 6,723,979 B2 | 4/2004 | Kastura |
| 7,305,771 B2 | 12/2007 | Lin |
| 7,318,283 B2 | 1/2008 | Kurose et al. |
| 7,353,615 B1 | 4/2008 | Branch |
| 7,845,086 B2 | 12/2010 | Makimura |
| 7,926,194 B2 | 4/2011 | Katoh et al. |
| 8,056,247 B2 | 11/2011 | Lai |
| 8,074,366 B2 | 12/2011 | Jiang |
| 8,181,354 B2 | 5/2012 | Ozawa |
| 8,256,124 B2 | 9/2012 | Su et al. |
| 8,671,582 B2 * | 3/2014 | Branch .................. G01C 9/10 33/333 |
| 2005/0248467 A1 | 11/2005 | Igami et al. |
| 2008/0235964 A1 | 10/2008 | Ozawa |
| 2010/0101103 A1 | 4/2010 | Horio et al. |
| 2010/0315070 A1 | 12/2010 | Hong |

OTHER PUBLICATIONS

International Search Report and Written Opinion; PCT Application No. PCT/US2013/045700; Sep. 17, 2013.

Notification of Substantive Examination; China Patent Application No. 201380040319.0; Mar. 15, 2016.

European Search Report; European Patent Application No. 13824893.5; Mar. 1, 2016.

* cited by examiner

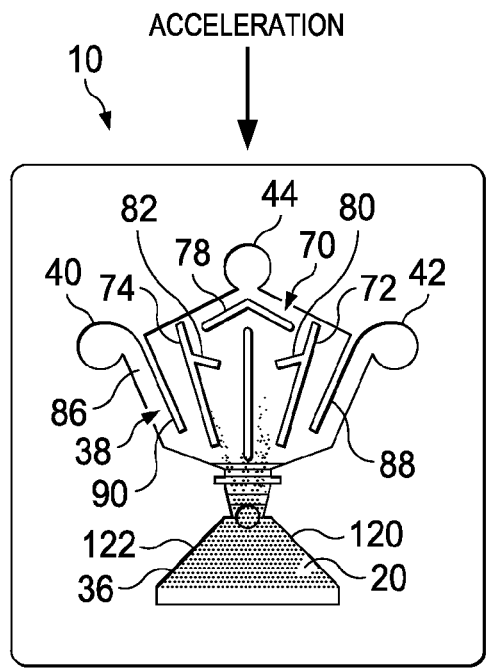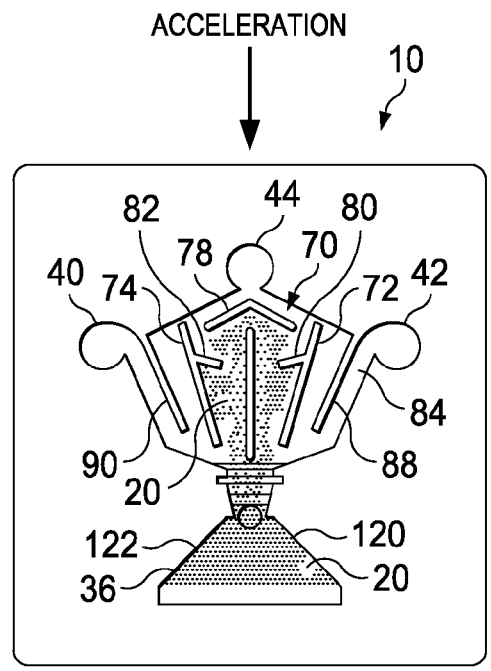
FIG. 7A  FIG. 7B
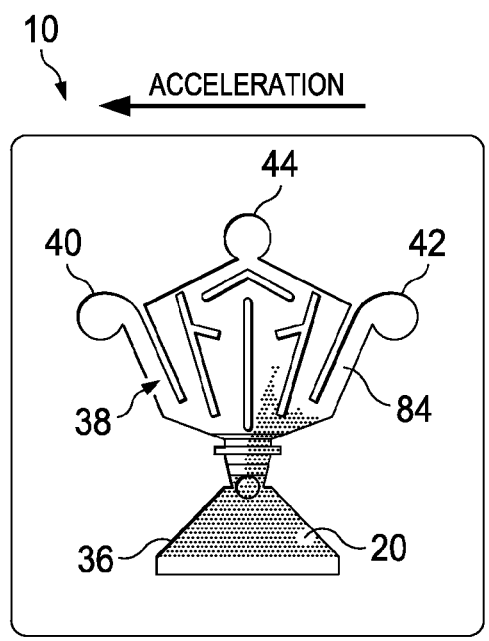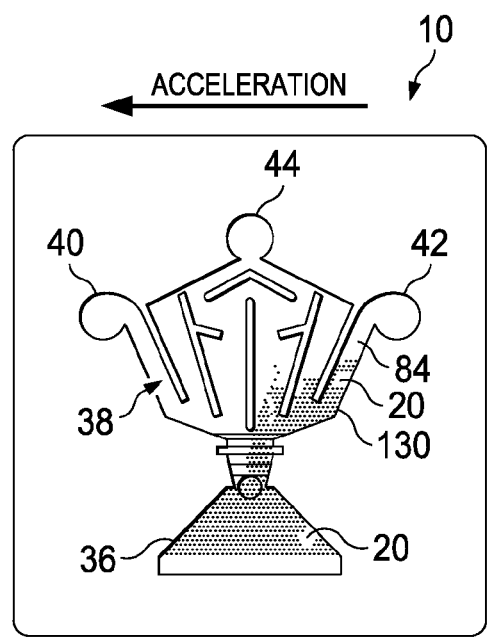
FIG. 8A  FIG. 8B

TILT INDICATOR

BACKGROUND

During manufacturing, storage or transit, many types of objects need to be monitored due to the sensitivity or fragility of the objects. For example, some types of objects may be susceptible to damage if turned and/or tilted beyond some angular degree. Thus, for quality control purposes and/or the general monitoring of transportation conditions, it is desirable to determine and/or verify the conditions to which the object has experienced.

One type of device for object monitoring is called a tilt or tip indicator. One such type of device includes a plastic housing attachable to an object and having an internal metal disc where the metal disc resides within a receptacle within the housing. The front of the housing includes a window where the metal disc can be seen therethrough (with a color indicator located behind the disc and hidden from view before a tilting event has occurred). If the object is tilted beyond some predetermined angle, the metal disc falls out of the receptacle such that the color indicator can then be seen, indicating a tilt event has occurred. Another type of device include a metal ball residing within a tubular track such that, in response to tilting of the object, the metal ball moves within the track to another location, thereby indicating the degree of tilting that has occurred.

BRIEF SUMMARY

According to one aspect of the present disclosure, a device and technique for tilt detection and indication is disclosed. The tilt indicator includes a first member having a reservoir for retaining a granular indicating media therein, and a second member coupled to the first member and having an adhesive portion located corresponding to an indicating area of the first member. Responsive to a tilt event, at least a portion of the indicating media exits the reservoir and travels to the indicating area, the adhesive portion retaining at least a portion of the indicating media within the indicating area.

According to another aspect of the present disclosure, a tilt indicator includes a first member coupled to a second member and forming a cavity therebetween, the cavity including a reservoir for retaining a granular indicating media therein and an indicating area spaced apart from the reservoir. An adhesive layer is disposed on at least one of the first and second members in an area corresponding to the indicating area. Responsive to a tilt event, at least a portion of the indicating media exits the reservoir and travels to the indicating area, the adhesive layer retaining at least a portion of the indicating media within the indicating area.

According to yet another aspect of the present disclosure, a tilt indicator includes a base assembly formed having an internal cavity, the cavity including a reservoir for holding a granular indicating media therein and an indicating area spaced apart from the reservoir. The base assembly further comprises a retention element located proximate to the indicating area. Responsive to tilting of the tilt indicator from a first orientation to a second orientation, at least a portion of the indicating media exits the reservoir and travels to the indicating area, the retention element retaining at least a portion of the indicating media within the indicating area in response to the tilt indicator returning to the first orientation from the second orientation.

According to yet a further aspect of the present disclosure, a tilt indicator includes a base assembly formed having an internal cavity, the cavity including a reservoir for holding a granular indicating media therein, an indicating area, and a buffering area between the reservoir and the indicating area. The buffering area is configured to: responsive to tilt event, enable at least a portion of the indicating media to travel from the reservoir to the indicating area; and, responsive to an acceleration event, impede travel of the indicating media from the reservoir to the indicating area.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIGS. 7A and 7B are diagrams illustrating various stages of the tilt indicator of FIGS. 1, 2 and 3 in response to a vertical acceleration event according to the present disclosure;

FIGS. 8A and 8B are diagrams illustrating various stages of the tilt indicator of FIGS. 1, 2 and 3 in response to a lateral acceleration event according to the present disclosure.

DETAILED DESCRIPTION

Embodiments of the present disclosure provide a device and technique for tilt detection and indication. According to one embodiment, a tilt indicator includes a first member having a reservoir for retaining a granular indicating media therein, and a second member coupled to the first member and having an adhesive portion located corresponding to an indicating area of the first member. Responsive to a tilt event, at least a portion of the indicating media exits the reservoir and travels to the indicating area, the adhesive portion retaining at least a portion of the indicating media within the indicating area. Embodiments of the present disclosure provide tilt detection and indication in multiple directions. Embodiments of the present disclosure further prevent false indications by preventing tilt indication in response to relatively short duration acceleration events.

Figure 1:
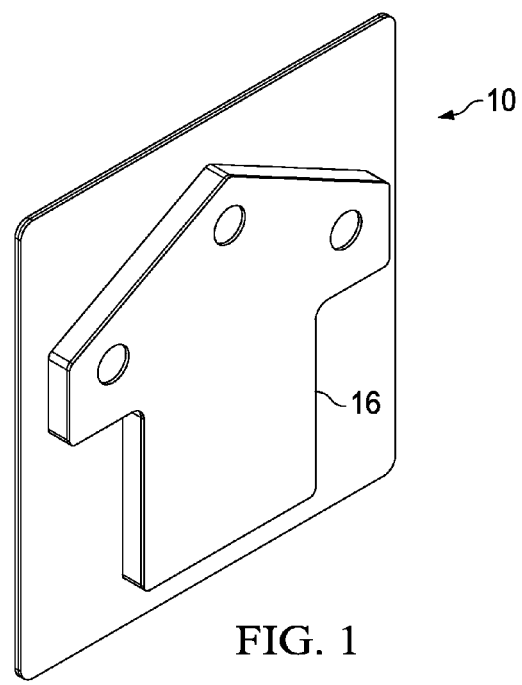
FIG. 1 is a diagram illustrating an assembled view of a tilt indicator according to the present disclosure.
Figure 3:
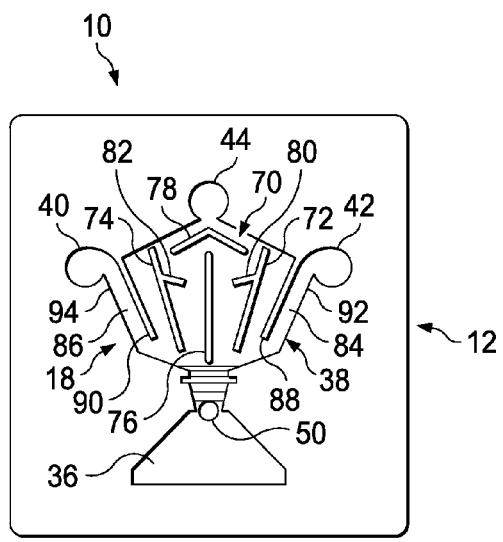
FIG. 3 is a diagram illustrating a plan view of an embodiment of a base member of the tilt indicator of FIGS. 1 and 2 according to the present disclosure.
Figure 2:
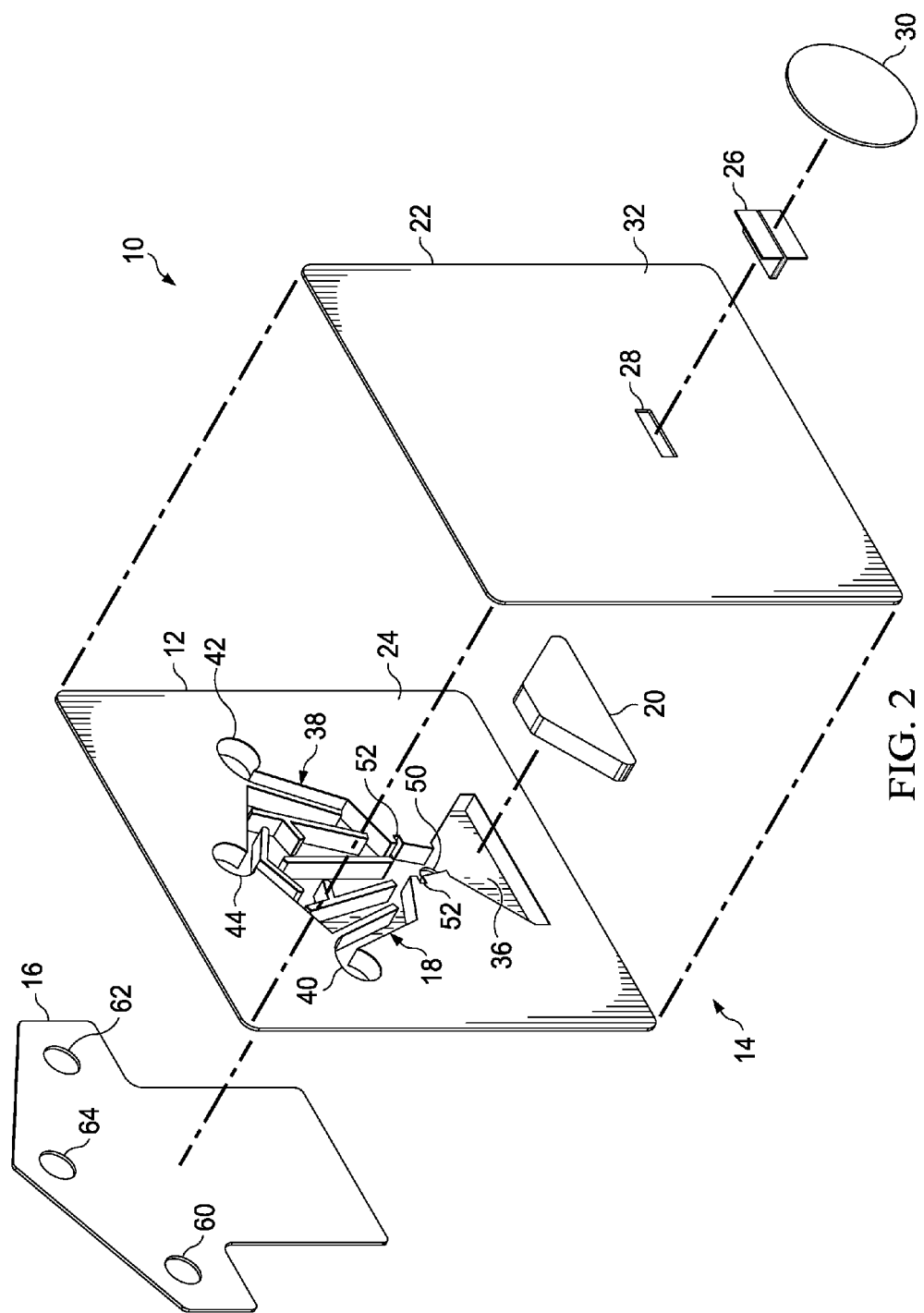
FIG. 2 is a diagram illustrating an exploded assembly view of the tilt indicator of FIG. 1 according to the present disclosure.

With reference now to the Figures and in particular with reference to FIGS. 1, 2 and 3, exemplary diagrams of a tilt indicator 10 are provided in which illustrative embodiments of the present disclosure may be implemented. In FIGS. 1, 2 and 3, tilt indicator 10 is a portable device configured to be affixed to or disposed within a transport container containing an object, on the object itself, or otherwise associated with an object, of which tilt events associated therewith are to be monitored. Embodiments of tilt indicator 10 monitor whether an object has been exposed to a tilting event or change in orientation during manufacturing, storage and/or transport of the object. In some embodiments, tilt indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that the above examples are only exemplary and are not intended to assert or imply any limitation with regard to the environments in which different embodiments of the tilt indicator of the present disclosure may be implemented.

FIG. 1 is a diagram illustrating an assembled view of tilt indicator 10, and FIG. 2 is a diagram illustrating an exploded assembly view of tilt indicator 10 of FIG. 1. FIG. 3 is a diagram illustrating a plan view of a base member 12 of tilt indicator 10 of FIGS. 1 and 2. In the embodiment illustrated in FIGS. 1, 2 and 3, tilt indicator 10 comprises a base assembly 14 and a cover member 16. Base assembly 14 may comprise a single, unitary structure (e.g., a molded or cast structure) or may comprise multiple components coupled together to form an internal cavity 18 for holding therein and enabling the flow therein of an indicating media 20. For example, in the illustrated embodiment, base assembly 14 includes base member 12 couplable to a rear member 22. In some embodiments, rear member 22 may include an adhesive layer (see FIG. 4) selectively applied to a side of rear member 22 facing base member 12 to facilitate attachment of rear member 22 to portions of a rearwardly facing surface 24 of base member 12. However, it should be understood that rear member 22 may be otherwise secured to base member 12 (e.g., fasteners/gasket, welding, etc.). In some embodiments, base assembly 14 may also include an arming plug 26 configured to extend through an opening 28 of rear member 22, and a retention element 30 for retaining arming plug 26 within opening 28 until arming/activation of tilt indicator 10 is desired. In some embodiments, retention element 30 may comprise an adhesive-backed label that is removably attached to arming plug 26 and at least a portion of a rear surface 32 of rear member 22 to retain arming plug 26 within opening 28 until removed/peeled away by a user of tilt indicator 10. However, it should be understood that other devices and/or methods may be used to retain arming plug 26 in a pre-activated position within tilt indicator 10 until armed/activated.

In the embodiment illustrated in FIGS. 1-3, cavity 18 of base member 12 is formed having a reservoir 36, a buffering area 38, and indicating areas 40, 42 and 44. It should be understood that the quantity of indicating areas may be greater or fewer. In the illustrated embodiment, indicating area 44 is located slightly higher in a vertical direction than indicating areas 40 and 42; however, it should be understood that the vertical positioning of indicating areas 40, 42 and 44 may vary (e.g., based on a desired flow distance from reservoir 36). Base member 12 may comprise a molded component having a closed side (e.g., facing cover member 16) and an open side (e.g., facing rear member 22) such that securing of rear member 22 to surface 24 essentially encloses cavity 18. However, it should be understood that the formation of cavity 18 may be otherwise constructed. In some embodiments, a wall of base member 12 facing cover member 16 may comprise an opening 50 for introducing media 20 into cavity 18. For example, in some embodiments, rear member 22 may be secured to surface 24 to substantially enclose cavity 18. Arming plug 26 may then be inserted into/through opening 28 and into corresponding detents 52 in base member 12 located slightly above reservoir 36. Retention element 30 may then be placed over arming plug 26 to retain arming plug 26 within base member 12. Media 20 may then be introduced into reservoir 36 via opening 50 (which is located below detents 52 and arming plug 26). Cover member 16 may then be placed onto a side of base member 12 corresponding to opening 50 (e.g., via adhesive or otherwise) to seal/close opening 50. In this illustrated embodiment, media 20 is thereby retained within reservoir 36 until tilt indicator 10 is activated/armed. Activating/arming tilt indicator 10 may be accomplished by removing retention element 30 and arming plug 26. Tilt indicator 10 may then be secured to an object to be monitored. For example, in some embodiments, rear surface 32 of rear member 22 may comprise a peelable backing layer having an adhesive layer thereunder/thereon such that rear surface 32 is adhesively secured to an object to be monitored (and thereby sealing/closing opening 28). However, it should be understood that base assembly 14 may be otherwise formed, assembled and/or constructed.

In the illustrated embodiment, cover member 16 is secured to a forward-facing surface of base member 12 and includes three indicating regions 60, 62 and 64 corresponding to and/or otherwise aligned with respective indicating areas 40, 42 and 44. For example, in some embodiments, regions 60, 62 and 64 may comprise openings enabling visibility of indicating areas 40, 42 and 44 therethrough. In some embodiments, cover member 16 may comprise an opaque element except for regions 60, 62 and 64 (which may comprise transparent/translucent portions) such that cavity 18 is shielded from view from a forward-facing side of tilt indicator 10 except for indicating areas 40, 42 and 44. Cover member 16 may alternatively be formed from a transparent/translucent material and painted/printed in areas except for regions 60, 62 and 64. It should be understood that in some embodiments, cover member 16 may be omitted. For example, in some embodiments, base member 12 may be formed from a substantially opaque material (shielding visibility of cavity 18 from a forward-facing side of tilt indicator 10 except for indicating areas 40, 42 and 44 (e.g., the forward-facing surfaces of base member 12 in indicating areas 40, 42 and 44 may be buffed, polished and/or otherwise treated to enable visibility of indicating areas 40, 42 and 44)). In this embodiment, opening 50 may also be omitted (e.g., placing media 20 within reservoir from a rear side of base assembly 14). In some embodiments, cover member 16 may be omitted and base member 12 formed from a transparent/translucent material and painted except for areas corresponding to indicating areas 40, 42 and 44. Thus, it should be understood that base assembly 14 may be configured differently such that indicating areas 40, 42 and 44 are visible from a forward-facing side of tilt indicator 10 to enable viewing of indicating areas 40, 42 and 44 to determine whether a tilting event has occurred.

In the illustrated embodiment, buffering area 38 is located between reservoir 36 and indicating areas 40, 42 and 44. Buffering area 38 includes a number of blocking elements 70 configured to impede the flow of media 20 from reservoir 36 to one or more of indicating areas 40, 42 and 44. For example, blocking elements 70 may comprise outwardly extending walls, posts, ridges and/or protrusions within cavity 18 that are positioned between reservoir 36 and one or more of indicating areas 40, 42 and 44 to prevent and/or impede media 20 from reaching indicating areas 40, 42 and 44 in response to experiencing a short duration acceleration event. In the illustrated embodiment, blocking elements 70 include elements 72, 74, 76 and 78. It should be understood that the quantity, shape and/or form of blocking elements 70 may be varied to produce a desired impediment to media 20 flow. In the illustrated embodiment, member 78 is located slightly below indicating area 44 and functions to substantially block a direct flow path for media 20 to reach indicating area 44. Members 72 and 74 each have downwardly extending arms 80 and 82, respectively, that function to impede the direct flow of media 20 to indicating area 44. Member 76 is centrally located in a substantially vertical direction and functions to impede lateral media 20 flow movement into media flow paths 84 and 86 that lead to respective indicating areas 42 and 40. For example, in the illustrated embodiment, base member 12 includes downwardly extending walls 88 and 90 that, in cooperation with respective opposing sidewalls 92 and 94, define and/or otherwise form respective media flow paths 84 and 86.

Figure 4:
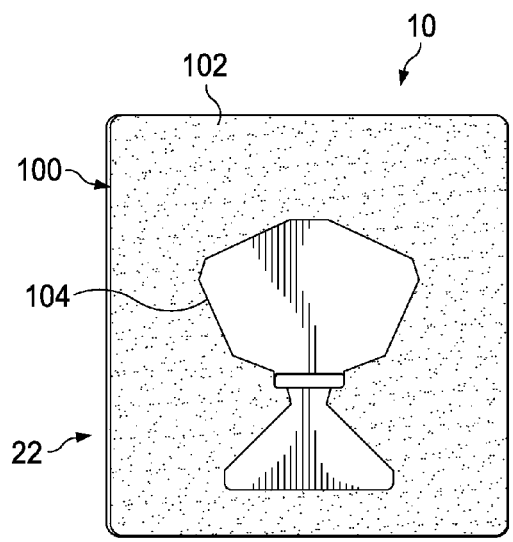
FIG. 4 is a diagram illustrating a plan view of an embodiment of a rear member of the tilt indicator of FIGS. 1 and 2 according to the present disclosure.

FIG. 4 is a diagram illustrating an embodiment of rear member 22 in accordance with the present disclosure. In the embodiment illustrated in FIG. 4, rear member 22 includes a retention element 100 for retaining at least a portion of media 20 within a respective indicating area 40, 42 and 44 in response to a portion of media 20 reaching a respective indicating area 40, 42 and 44. For example, in some embodiments, retention element 100 includes an adhesive layer 102 selectively applied to areas of rear member 22 located outside of a periphery 104 of cavity 18 except for areas of rear member 22 located in alignment with indicating areas 40, 42 and 44. For example, in some embodiments, adhesive layer 102 is selectively applied to a surface/face of rear member 22 facing surface 24 of base member 12 to enable rear member 22 to be secured to base member 12 (as well as enclose cavity 18). Portions of adhesive layer 102 are located to extend over indicating areas 40, 42 and 44 for capturing and/or adhering thereto a portion of media 20 that may enter respective indicating areas 40, 42 and 44. It should be understood that in alternate embodiments, retention element 100 (e.g., an adhesive layer) may be located on base member 12 (e.g., instead of on rear member 22). For example, an adhesive layer may be applied to internal areas of base member 12 within indicating areas 40, 42 and 44. Further, in alternate embodiments, retention element 100 may be located on cover member 16. For example, in some embodiments, base member may be constructed as having cavity 18 extending therethrough such that cover member 16 and rear member 22 function to enclose cavity 18 when secured to base member 12. In this embodiment, cover member 16 may be configured having areas (e.g., regions 60, 62 and 64) that cover indicating areas 40, 42 and 44, and an adhesive layer may be applied to such areas such that the adhesive layer lies within respective indicating areas 40, 42 and 44. Thus, it should be understood that tilt indicator 10 may be constructed with various different embodiments. In the illustrated embodiment, retention element 100 comprises an adhesive layer/material for adhering thereto at least a portion of media 20 reaching a respective indicating area 40, 42 and 44. However, it should be understood that other types of retention elements may be used (e.g., depending on the type of media 20 used, different types of retention elements may be used). For example, if media 20 comprises a ferrous material, retention element 100 may comprise a magnetic material.

Figure 5A:
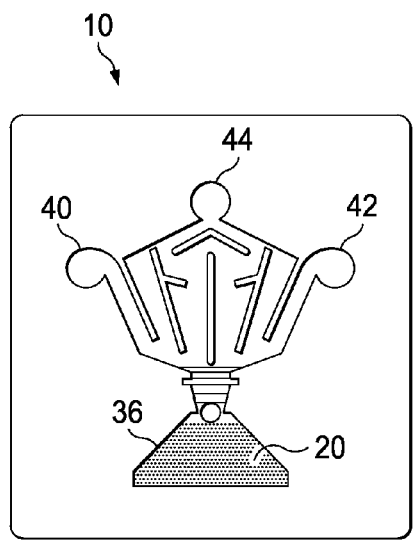
FIGS. 5A-5F are diagrams illustrating various stages of tilt or orientation change of the tilt indicator illustrated in FIGS. 1, 2 and 3 according to the present disclosure.
Figure 5B:
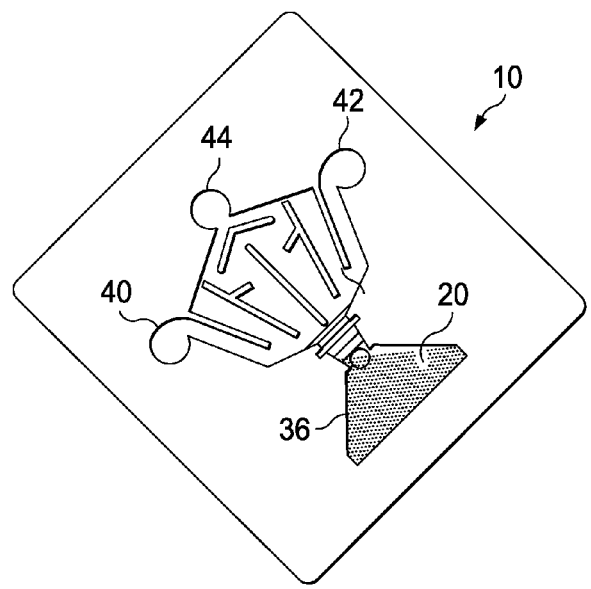
Figure 5C:
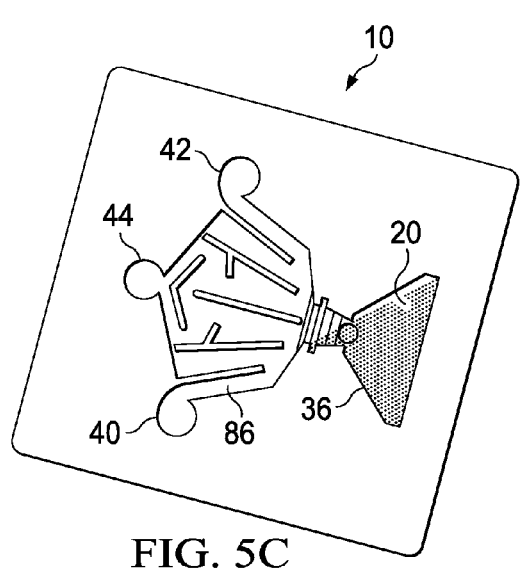
Figure 5D:
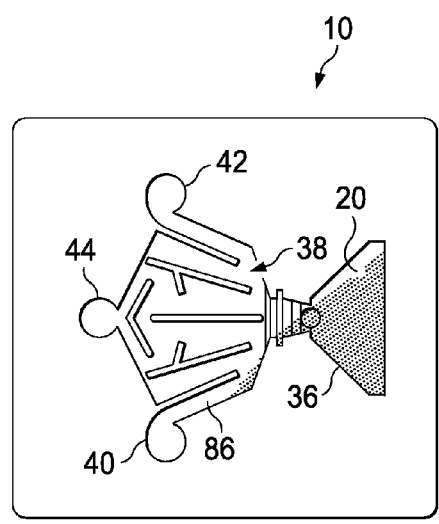
Figure 5E:
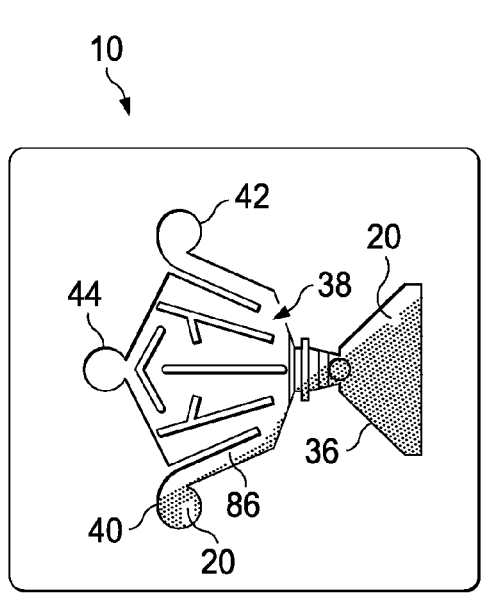
Figure 5F:
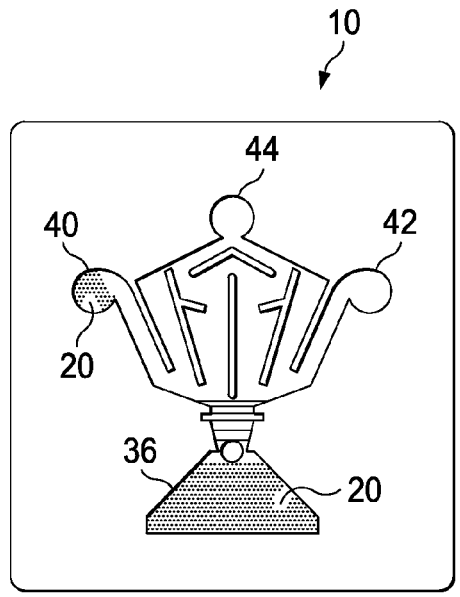

FIGS. 5A-5F are diagrams illustrating various stages of tilt or orientation change of tilt indicator 10 illustrated in FIGS. 1, 2 and 3 according to the present disclosure. In the illustrated embodiment, various components of tilt indicator 10 are omitted/hidden to better illustrate the position/flow of media 20 in response to changes in orientation of tilt indicator 10. FIG. 5A depicts tilt indicator 10 in a vertical position (e.g., secured to an object to be monitored) in an armed/activated state. FIGS. 5B-5E depict tilt indicator 10 in response to a counterclockwise tilting event. FIG. 5F depicts tilt indicator 10 after being returned to a vertical orientation after the tilting event depicted in FIGS. 5B-5E. As illustrated in FIGS. 5B-5E, as tilt indicator 10 is tilted in the counterclockwise direction, media 20 begins exiting reservoir 36 and entering buffering area 38. In some embodiments, media 20 comprises a granular and/or crystalline media such that granules/crystals of media 20 flow into buffering area 38 and flow toward media flow path 86. For example, in some embodiments, media 20 may comprise crushed quartz or another granular/crystalline media having a relatively low mass. However, it should be understood that other substances may also be used for media 20.

As best illustrated in FIGS. 5C-5E, as tilt indicator 10 is tilted, media flow path 86 becomes oriented at a downwardly sloping direction relative to reservoir 36, thereby facilitating the flow of media 20 down flow path 86 and into indicating area 40. As described above, retention element 100 is located in the area of indicating area 40 (e.g., adhesive layer 102) such that at least a portion of media entering indicating area 40 adheres to adhesive layer 102. FIG. 5F depicts tilt indicator 10 after the return of tilt indicator 10 to a vertical orientation. As illustrated in FIG. 5F, a portion of media 20 that has adhered to adhesive layer 102 is retained within indicating area 40 (while a remainder of media 20 may return to reservoir 36) and is thereby visible as an indication that the monitored object has experienced a tilting event (e.g., tilted beyond some angular orientation causing media 20 to enter indicating area 40). For example, media 20 may be of a color that is visible through cover member 16 (e.g., through region 60) to provide an indication of a tilting event. For example, in the pre-activated state, the area within region 60 may be uncolored or of a certain color which changes due to the color/presence of media 20 within indicating area 40/region 60. For ease of illustration and description, FIGS. 5A-5F depict a counterclockwise tilting event; however, it should be understood that a similar process as described above occurs for a clockwise tilting event (e.g., media 20 flowing into indicating area 42 and being visible within/through region 62 of cover member 16).

Figure 6A:
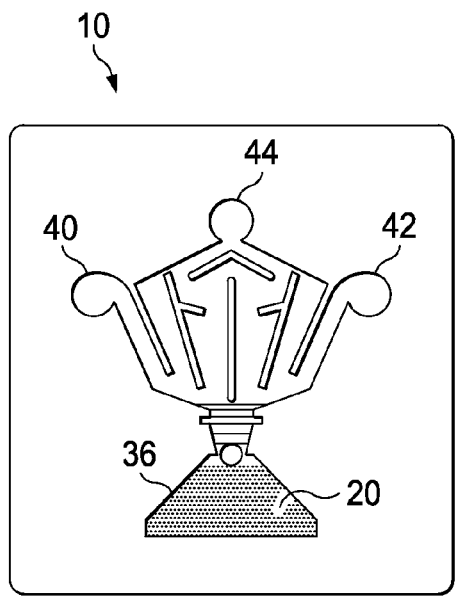
FIGS. 6A-6H are diagrams illustrating various stages of tilt or inversion orientation change of the tilt indicator illustrated in FIGS. 1, 2 and 3 according to the present disclosure.
Figure 6B:
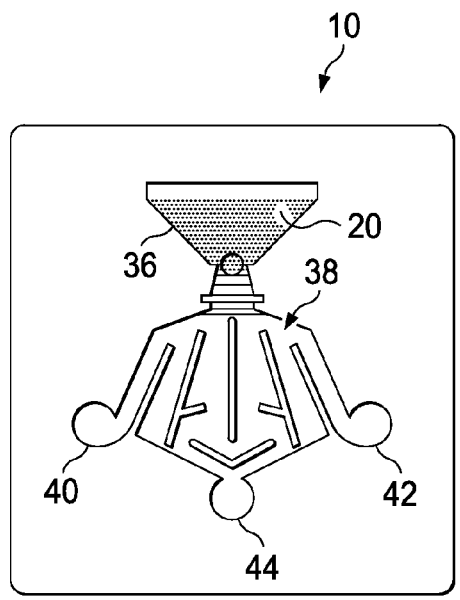
Figure 6C:
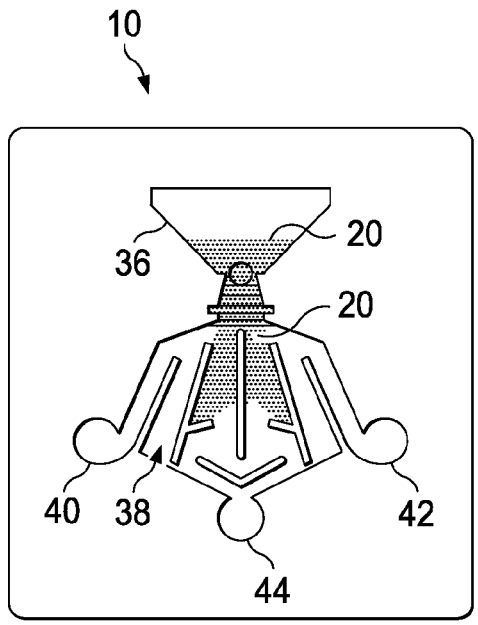
Figure 6D:
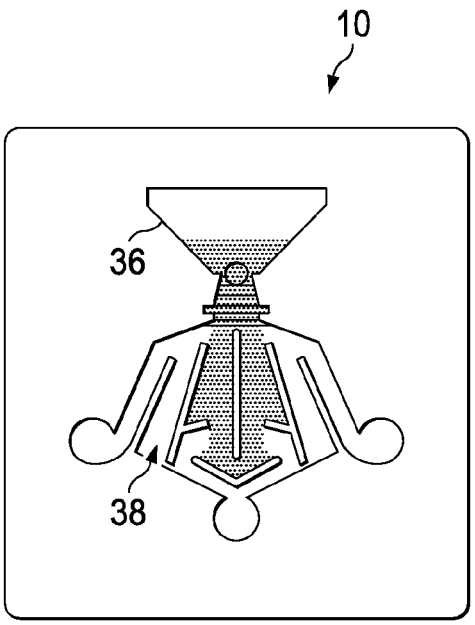
Figure 6E:
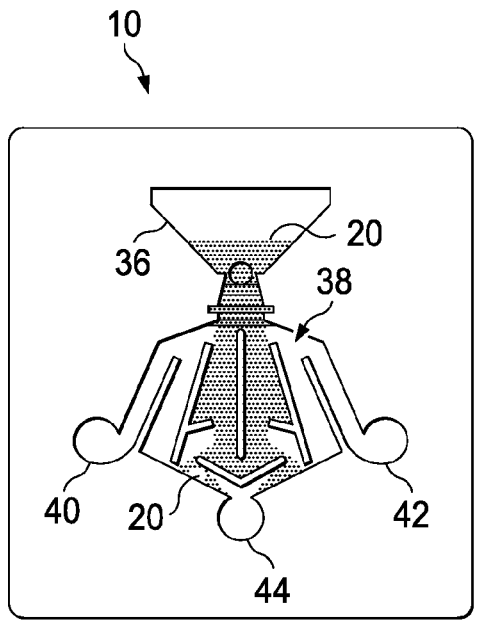
Figure 6F:
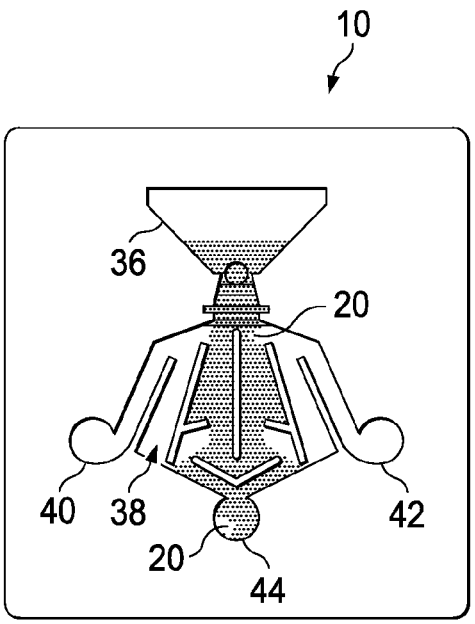
Figure 6G:
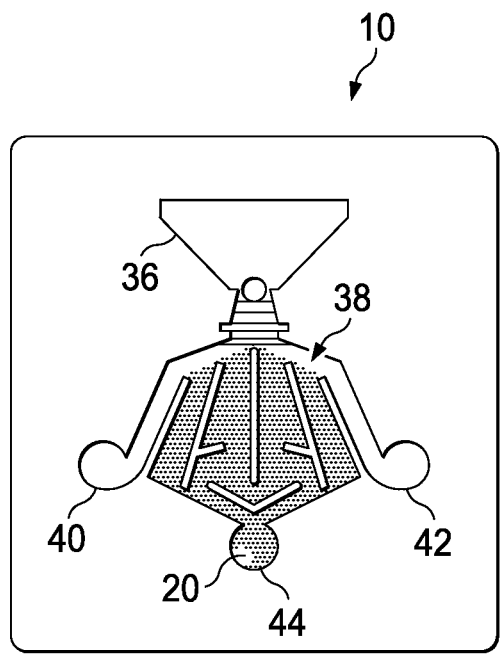
Figure 6H:
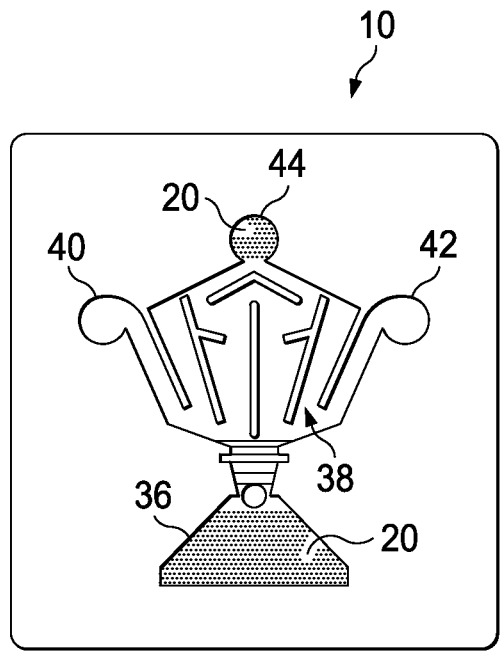

FIGS. 6A-6H are diagrams illustrating various stages of tilt or orientation change of tilt indicator 10 illustrated in FIGS. 1, 2 and 3 according to the present disclosure. In the illustrated embodiment, various components of tilt indicator 10 are omitted/hidden to better illustrate the position/flow of media 20 in response to changes in orientation of tilt indicator 10. FIG. 6A depicts tilt indicator 10 in a vertical position (e.g., secured to an object to be monitored) in an armed/activated state. FIGS. 6B-6G depict tilt indicator 10 in response to an inversion tilting event (e.g., tilt indicator 10 being rotated forward (or rearward) by 180 degrees and/or rotated in the existing plane of tilt indicator by 180 degrees). FIG. 6H depicts tilt indicator 10 after being returned to a vertical orientation after the inversion/tilting event depicted in FIGS. 6B-6G. As illustrated in FIGS. 6B-6G, in response to the inversion tilting of tilt indicator 10, media 20 exits reservoir 36 and enters buffering area 38. Media travels downwardly within buffering area 38, past and/or through flow channels formed by blocking elements 70 toward indicating area 44. As described above, retention element 100 is located in the area of indicating area 44 (e.g., adhesive layer 102) such that at least a portion of media entering indicating area 44 adheres to adhesive layer 102. FIG. 6H depicts tilt indicator 10 after the return of tilt indicator 10 to a vertical orientation. As illustrated in FIG. 6H, a portion of media 20 that has adhered to adhesive layer 102 is retained within indicating area 44 (while a remainder of media 20 may return to reservoir 36) and is thereby visible (e.g., through/within region 64 of cover member 16) as an indication that the monitored object has experienced an inversion tilting event.

FIGS. 7A and 7B are diagrams illustrating various stages of tilt indicator 10 of FIGS. 1, 2 and 3 in response to a vertical acceleration event according to the present disclosure. In the embodiment illustrated in FIGS. 7A and 7B, a downward acceleration event is experienced by tilt indicator 10. Tilt indicator 10 and, specifically, buffering area 38, is configured such that vibration and/or acceleration events of low time duration will not cause indicating media 20 to enter indicating area 40, 42 and 44 and give a false indication that a tilting event has occurred. For example, in the illustrated embodiment, false tilting indications are prevented by blocking elements 70 formed within buffering area 38. In response to a downward acceleration event and/or vertical vibrations, media 20 attempts to move directly upwards out of reservoir 36. Initially, tapered, upper sidewalls 120 and 122 of reservoir 36 cause a compression of indicting media 20 as indicating media 20 attempts to upwardly exit reservoir 36. This compression action impedes the flow of indicating media 20 upwards from reservoir 36. Indicating media 20 that continues upwardly will collide with blocking elements 70 located within buffering area 38 (e.g., elements 72, 74 and 78, and arms 80 and 82) that serve to deflect and impede the progress of indicating media 20 upwardly. Any indicating media 20 travelling upwards is blocked/deflected, thereby creating an amount of turbulence in the flow of indicating media 20. This turbulence further slows down and/or reduces the flow rate and travel of indicating media 20 upwardly. These collisions lengthen the time required for indicating media 20 to flow through buffering area 38 and functions as a filter to block and impede the movement of indicating media 20 until the acceleration/vibration event has ceased/decreased. When the acceleration/vibration has ceased/decreased, indicating media 20 within buffering area 38 then returns back to reservoir 36. Thus, in response to vertical/downward acceleration of tilt indicator 10, indicating media 20 is substantially deflected and/or prevented from entering into indicating area 44. Further, walls 88 and 90 substantially deflect and/or prevent indicating media 20 from entering media flow paths 84 and 86 leading to respective indicating areas 42 and 40.

FIGS. 8A and 8B are diagrams illustrating various stages of tilt indicator 10 of FIGS. 1, 2 and 3 in response to a lateral acceleration event according to the present disclosure. In the embodiment illustrated in FIGS. 8A and 8B, an acceleration event in a left lateral direction is depicted; however, it should be understood that a right lateral acceleration event may be similar. Thus, an acceleration of tilt indicator 10 in a left lateral direction will direct indicating media 20 to the right side of reservoir 36, and a top portion of indicating media 20 may begin to escape reservoir 36 into buffering area 38. If the duration of the acceleration is long enough, indicating media 20 may approach the mouth of media flow path that leads to indicating area 42. As indicating media 20 begins to move into and/or near media flow path 84, indicating media 20 encounters an angled change in direction caused by an angled portion of a sidewall 130 of cavity 18 that increases the resistance to the flow of indicating media 20. In some embodiments, indicating media 20 comprises a collection of very small granules, crystals or other type of solid, particulate matter that have a low mass and thus are not capable of producing appreciable momentum. This characteristic impedes the travel of indicating media 20 up media flow path 84. The restriction of flow of indicating media 20 slows the travel/flow rate of indicating media 20 such that the acceleration may subside before indicating media 20 travels through media flow path 84 and arrives at indication area 42. For example, tilting events are generally of a longer duration than acceleration/vibration events. Embodiments of the present tilt indicator 10 are configured to delay the flow of indicating media 20 such that short duration acceleration/vibration events result in indicating media 20 being blocked/impeded from flowing into indicating areas 40, 42 and 44. When a tilting event occurs, indicating media 20 has additional time to flow though buffering area 38 and arrive at one or more of indicating areas 40, 42 and 44.

Embodiments of the present disclosure are configured as a function of the angle of repose of indicating media 20. For example, the angles, lengths and shapes of features such as reservoir 36, buffering area 38 and/or blocking elements 70 are configured to achieve the desired angle(s) of tilt activation and, in some embodiments, ensure that when tilt indicator 10 returns to the upright/vertical position, indicating media 20, except for indicating media 20 that has adhered to adhesive layer 102 within a respective indicating area 40, 42 and/or 44, returns to reservoir 36.

Base member 12 may be formed from transparent, translucent, semi-opaque or opaque materials. For example, if formed as a molded component, base member 12 may be formed from transparent, translucent or semi-opaque material such that indicating media 20 located within indicating areas 40, 42 and/or 44 are visible through a corresponding portion of base member 12. Areas of base member 12 outside or adjacent to indicating areas 40, 42 and 44 may be masked, painted, covered, etc. (in some embodiments, cover member 16 may then be omitted). If base member 12 is formed with cut-outs forming some or all of reservoir 36, buffering area 38 and indicating areas 40, 42 and 44, base member 12 may be formed from any material (e.g., transparent, translucent, semi-opaque or opaque materials) such that cover member 16 and/or rear member 22 includes windows enabling visibility of indicating media 20 when located in indicating areas 40, 42 and 44.

In the illustrated embodiment, three indicating areas 40, 42 and 44 are illustrated. However, it should be understood that a greater or fewer quantity of indicating areas may be included in tilt indicator 10. For example, tilt indicator 10 may be formed with a single indicating area (e.g., to accommodate applications where a single or particular tilt direction or magnitude of tilt is of concern). In some embodiments, multiple indicating areas may be included along a particular side of tilt indicator 10 (e.g., one at 25 degrees from horizontal, one at 55 degrees from horizontal, and one at 90 degrees from horizontal) to enable a visual indication of different degrees or magnitudes of detected tilt.

Figure 9:
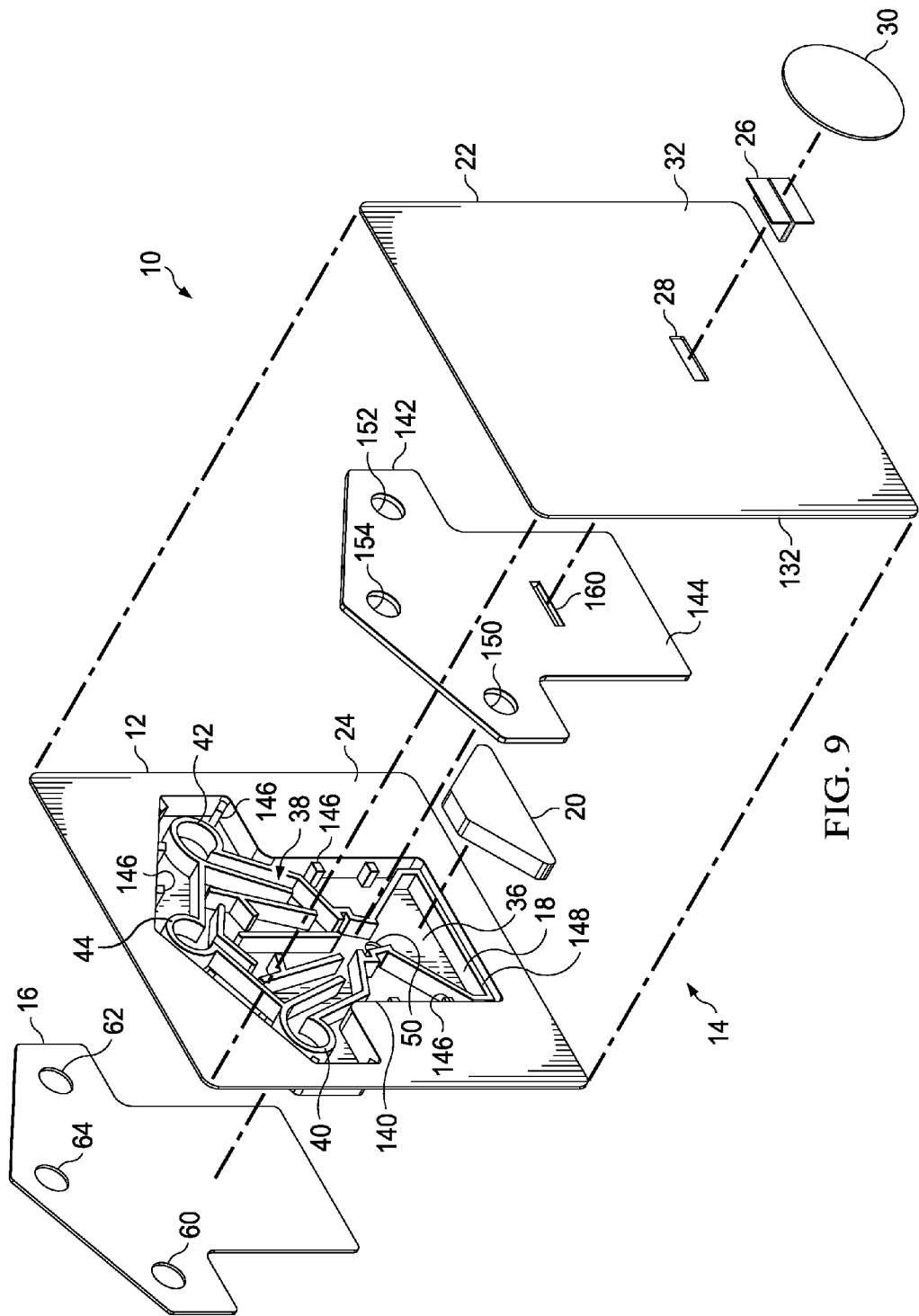
FIG. 9 is a diagram illustrating an exploded assembly view of another embodiment of a tilt indicator according to the present disclosure.

FIG. 9 is a diagram illustrating an exploded assembly view of another embodiment of tilt indicator 10 according to the present disclosure. In the embodiment illustrated in FIG. 9, tilt indicator 10 comprises base assembly 14 and cover member 16. As illustrated in FIG. 9, base assembly 14 comprises base member 12 couplable to rear member 22. In this embodiment, rear member 22 includes an adhesive layer 132 applied to a side of rear member 22 facing base member 12 to facilitate attachment of rear member 22 to portions of rearwardly facing surface 24 of base member 12. As will be described further below, adhesive layer 132 also functions as retention element 100 (FIG. 4) for retaining at least a portion of media within indicating areas 40, 42 and 44. In the illustrated embodiment, base assembly 14 also includes arming plug 26 configured to extend through opening 28 of rear member 22, and retention element 30 for retaining arming plug 26 within opening 28 until arming/activation of tilt indicator 10 is desired.

In the embodiment illustrated in FIG. 9, base member 12 comprises a molded component having a recess 140 formed therein and being open in a direction facing rear member 22 and closed in a direction toward cover member 16. Recess 140 extends around a periphery of cavity 18. For example, cavity 18 includes reservoir 36, buffering area 38, and indicating areas 40, 42 and 44. Cavity 18 is formed being closed toward cover member 16 and open toward rear member 22. In the illustrated embodiment, base assembly 14 also includes a backplate 142. Backplate 142 is formed having a shape complementary to a shape of recess 140 such that backplate 142 is placed into recess 140 until a rearwardly facing surface 144 of backplate 142 is flush (e.g., flush or substantially flush) with surface 24. In the illustrated embodiment, one or more standoffs 146 are formed about a periphery of recess 140, and a rearwardly facing surface 148 of walls forming cavity 18 are formed slightly below surface 24, such that backplate 144 is slid into recess 140 and sits atop surface 148 and standoffs 146. Backplate 142 also includes openings 150, 152 and 154 corresponding to respective locations of indicating areas 40, 42 and 44, which are aligned with respective indicating regions 60, 62 and 64 of cover member 16.

A wall of base member 12 facing cover member 16 may comprise opening 50 for introducing media 20 into cavity 18. For example, in the illustrated embodiment, backplate 142 is placed within recess 140 and encloses the rearward portion of cavity 18 (e.g., except for openings 150, 152 154 and an opening 160 for receiving arming plug 26 therethrough). Rear member 22 includes adhesive layer 132 extending substantially over an entire forwardly facing surface thereof (e.g., facing backplate 142) and is secured thereby to surface 24 and to surface 144. Arming plug 26 may then be inserted into/through openings 28 and 160 and into base member 12 located slightly above reservoir 36.

Media 20 may then be introduced into reservoir 36 via opening 50. Cover member 16 may then be placed onto a side of base member 12 corresponding to opening 50 (e.g., via adhesive or otherwise) to seal/close opening 50. In this illustrated embodiment, media 20 is thereby retained within reservoir 36 until tilt indicator 10 is activated/armed. Activating/arming tilt indicator 10 may be accomplished by removing retention element 30 and arming plug 26. Tilt indicator 10 may then be secured to an object to be monitored. For example, in some embodiments, rear surface 32 of rear member 22 may comprise a peelable backing layer having an adhesive layer thereunder/thereon such that rear surface 32 is adhesively secured to an object to be monitored (and thereby sealing/closing opening 28). However, it should be understood that base assembly 14 may be otherwise formed, assembled and/or constructed.

In the illustrated embodiment, adhesive layer 132 applied to a forwardly facing surface of rear member 22 (e.g., facing backplate 142) and extends across/over openings 150, 152 and 154 such that media 20 that may enter respective indicating areas 40, 42 and 44 resulting from tilting of tilt indicator 10 is retained thereon/thereto, thereby providing a visual indication of a tilt event via respective regions 60, 62 and 64.

Thus, embodiments of the present disclosure enable tilt event detection and indication that inhibits false tilt indications. Embodiments of the present disclosure provide a tilt indicator that includes elements that impede, deflect and/or otherwise inhibit a tilt indication in response to relatively short duration acceleration and/or vibration events.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A tilt indicator, comprising:
    a first member having a reservoir for retaining a granular indicating media therein, an indicating area, a buffering area located between the reservoir and the indicating area, and a blocking element located within the buffering area, the blocking element configured to impede travel of the indicating media from the reservoir toward the indicating area when the tilt indicator is in an activated state; and
    a second member coupled to the first member and having an adhesive portion located corresponding to the indicating area of the first member; and
    wherein, responsive to a tilt event, at least a portion of the indicating media exits the reservoir and travels to the indicating area, the adhesive portion retaining at least a portion of the indicating media within the indicating area.

2. The tilt indicator of claim 1, wherein the indicating media comprises crushed quartz.

3. The tilt indicator of claim 1, further comprising a narrowed passageway extending between the reservoir and the buffering area.

4. The tilt indicator of claim 3, further comprising an arming plug blocking the passageway and retaining the indicating media within the reservoir in a pre-activated state of the tilt indicator, the arming plug removable to place the tilt indicator in the activated state.

5. The tilt indicator of claim 1, wherein the indicating area comprises a first indicating area spaced apart from a second indicating area, the first indicating area located in an elevated vertical position relative to the second indicating area.

6. The tilt indicator of claim 1, wherein the blocking element comprises a first blocking element and a second blocking element, the first blocking element having a first end located proximate the reservoir and a second end located proximate the indicating area, and wherein the second blocking element extends over the second end of the first blocking element.

7. The tilt indicator of claim 1, wherein the indicating area comprises a first indicating area for visually indicating a tilt event in a first direction and a second indicating area for visually indicating a tilt event in a second direction.

8. A tilt indicator, comprising:
a first member coupled to a second member and forming a cavity therebetween, the cavity including a reservoir for retaining a granular indicating media therein, an indicating area spaced apart from the reservoir by a buffering area, and a blocking element located within the buffering area configured to impede travel of the indicating media from the reservoir to the indicating area when the tilt indicator is in an activated state; and
an adhesive layer disposed on at least one of the first and second members in an area corresponding to the indicating area; and
wherein, responsive to a tilt event, at least a portion of the indicating media exits the reservoir and travels to the indicating area, the adhesive layer retaining at least a portion of the indicating media within the indicating area.

9. The tilt indicator of claim 8, wherein, responsive to an acceleration event in a lateral or vertical direction causing the indicating media to exit the reservoir, the blocking element is configured to impede movement of the indicating media into the indicating area.

10. The tilt indicator of claim 8, wherein the indicating media comprises crushed quartz.

11. The tilt indicator of claim 8, wherein the indicating area comprises a first indicating area for visually indicating a tilt event in a first direction and a second indicating area for visually indicating a tilt event in a second direction.

12. The tilt indicator of claim 11, wherein the first indicating area is located in an elevated vertical position relative to the second indicating area.

13. A tilt indicator, comprising:
a base assembly formed having an internal cavity, the cavity including:
a reservoir for holding a granular indicating media therein;
an indicating area spaced apart from the reservoir by a buffering area; and
a blocking element located within the buffering area and configured to impede travel of the indicating media from the reservoir to the indicating area when the tilt indicator is in an activated state; and
wherein the base assembly further comprises a retention element located proximate to the indicating area; and
wherein, responsive to tilting of the tilt indicator from a first orientation to a second orientation, at least a portion of the indicating media exits the reservoir and travels to the indicating area, the retention element retaining at least a portion of the indicating media within the indicating area in response to the tilt indicator returning to the first orientation from the second orientation.

14. The tilt indicator of claim 13, wherein the blocking element is configured to cause turbulence in a flow of the indicating media exiting the reservoir in response to an acceleration event.

15. The tilt indicator of claim 13, wherein the blocking element is configured to reduce a speed of travel of the indicating media within the buffering area in response to an acceleration event.

16. The tilt indicator of claim 13, wherein the indicating media comprises crushed quartz.

17. The tilt indicator of claim 13, further comprising an arming plug for retaining the indicating media within the reservoir in a pre-activated state of the tilt indicator, the arming plug removable to place the tilt indicator into the activated state.

18. The tilt indicator of claim 13, wherein the blocking element comprises a first blocking element extending over an end of a second blocking element.

* * * * *